United States Patent
Findley et al.

(10) Patent No.: US 9,893,507 B2
(45) Date of Patent: Feb. 13, 2018

(54) BALL GRIP COMPRESSION FITTING

(71) Applicants: Robert Findley, Arlington, TX (US); Michael John Pastusek, Arlington, TX (US)

(72) Inventors: Robert Findley, Arlington, TX (US); Michael John Pastusek, Arlington, TX (US)

(*) Notice: Subject to any disclaimer, the term of this patent is extended or adjusted under 35 U.S.C. 154(b) by 414 days.

(21) Appl. No.: 14/541,695

(22) Filed: Nov. 14, 2014

(65) Prior Publication Data

US 2016/0141853 A1    May 19, 2016

(51) Int. Cl.
  *H02G 15/00* (2006.01)
  *H02G 15/013* (2006.01)
  *H02G 15/007* (2006.01)

(52) U.S. Cl.
  CPC ........ *H02G 15/013* (2013.01); *H02G 15/007* (2013.01)

(58) Field of Classification Search
  USPC ....................................................... 174/151
  See application file for complete search history.

(56) References Cited

U.S. PATENT DOCUMENTS

| 3,739,076 | A | 6/1973 | Schwartz |
| 4,130,286 | A | 12/1978 | Ernst et al. |
| 4,375,011 | A | 2/1983 | Grunau |
| 4,549,038 | A | 10/1985 | Masheris et al. |
| 7,749,021 | B2 | 7/2010 | Brodeur |
| 8,106,313 | B2 | 1/2012 | Tremaine |
| 9,059,580 | B2 * | 6/2015 | Magno, Jr. ........... H02G 15/013 |

* cited by examiner

*Primary Examiner* — Dhirubhai R Patel
(74) *Attorney, Agent, or Firm* — Bacon & Thomas, PLLC

(57) ABSTRACT

A connector is used for terminating an electrical cable, such as a metal clad cable, cord grip, and tray cable, and provides a compression fitting to secure and ground the cable. The connector includes a connector body, a compression nut, and a compression grommet retained therebetween. A gripping member and/or a grounding member is embedded within the grommet for creating a mechanical grip with the cable and providing a grounding pathway, respectively. Tightening the compression nut to the connector body correspondingly compresses the grommet to create a watertight seal with the cable so that no fluid, dirt or debris can pass through the connector. Such tightening also urges the gripping member to form a mechanical grip with the cable for securing the cable and maintaining the watertight seal. Moreover, the grounding member may include an electrically conductive grounding ball that forms the grounding path between the connector and the armor portion of the cable upon tightening the compression nut to the connector body.

20 Claims, 2 Drawing Sheets

BALL GRIP COMPRESSION FITTING

FIELD OF THE INVENTION

The present invention relates to a connection device with a compression fitting for securing, sealing and grounding a cable.

BACKGROUND

Many types of connectors exist for securing cables. For example, some conventional connectors use screw nuts to tighten a packing material around a cable retained within a socket. The packing material may become deformed as the screw nut is tightened, thus clamping the cable tighter. However, major disadvantages often arise from such connectors, especially since the resulting sealing effect is minimal. This allows for the possibility of dirt, debris and especially water to enter the connector.

Moreover, the packing material may tend to rotate with the screw nut, thus imparting a corresponding rotation to the cable causing it to twist. Even the use of anti-rotation rings and bushings supported within the screw nut cannot make up for these deficiencies when the packing material stays in contact with the threads of the screw nut. Additionally, the placement of an anti-rotation ring or bushing located between the screw nut and the packing material disadvantageously prevents the cable from being safely grounded.

Other conventional connectors may use a wedged bushing and chuck system as a means of restraining a cable. Typical chuck systems engage the cable tangentially and compress the cable jacket in order to prevent it from slipping or dislodging from the connector. Tightening a connector using a chuck, however, can commonly cause damage to the cable jacket, and thus may also compromise the integrity of the wires within.

Furthermore, the size of the chuck needed to tighten a connector can vary depending on the size of the connector. Therefore, multiple chucks are often needed in order to tighten different sized connectors. Purchasing multiple chucks suited to a wide range of cable sizes can be very costly, and there is a greater chance of losing extra parts that would need to be replaced. Moreover, forcing a user to alternate which size or type of chuck to use can also be very time consuming.

Although some conventional connectors may provide grounding to a cable, they typically comprise several separate parts that must be assembled together at the time the connector is installed. This installation often requires a considerable amount of time to complete, which also increases associated labor costs. Thus, careful attention must be paid by the user when installing such conventional connectors in order to avoid possible disconnections or cause the wiring to short. The armor shielding covering the cable is also often unintentionally broken during this process, which compromises the protection of the conducting wires retained therein.

It is thus apparent from the foregoing that conventional connectors have many drawbacks and disadvantages. Thus, there exists a clear need for a connector that solves these aforementioned problems, and which provides a quick and easy way to secure and retain a wide range of cables having various size diameters. There is also a need to provide a mechanical grip to create and maintain a tight seal between the connector and a non-uniform cable in order to ensure no dirt, debris or liquid can enter. Furthermore, there exists a clear need to provide a connector that creates a grounded barrier for the cable. The present disclosure addresses these aforementioned shortcomings.

SUMMARY

The present invention provides a connector that uses a compression fitting to secure and ground an electrical cable, such as an MC cable. The connector can be used to secure the cable to an opening, such as in the wall of an electrical box, as well as provide a grounding pathway for the cable. The connector also maintains a watertight seal with the cable so that no fluid, dirt or debris can pass through the opening.

The connector helps retain a cable to an opening and comprises a connector body, a tightening member such as a compression nut, and a compression member such as a compression grommet housed therebetween. The connector body defines a distal end and an opposite proximal end, and has an axial hole extending through the distal and proximal ends for receiving the cable. The tightening member is movably engaged to the proximal end of the connector body and the compression member is retained between the connector body and the tightening member. The compression member defines a through-hole having an inner wall for receiving the cable passing through the connector, and is configured to fittingly grip the cable to form a watertight seal when the tightening member is tightened to the connector body.

The compression grommet comprises at least one gripping member, such as a gripping ball, attached thereto for creating a mechanical grip with the cable, and/or at least one electrically conductive grounding member, such as a grounding ball, for providing a grounding pathway to the cable. The gripping member is attached to the compression member and adapted to form a mechanical grip with the cable when the tightening member is tightened to the connector body. Further tightening the tightening member to the connector body correspondingly strengthens the mechanical grip such that it secures the cable and maintains the watertight seal. The grounding member is also attached to the compression member, and adapted to provide a grounding path between the cable and the connector by tightening the tightening member to the connector body. Multiple gripping members may be coupled together by a flexible coupling member, such as one having a closed loop shape, i.e. a ring. Similarly, multiple grounding members may be coupled together by a flexible coupling member, such as one having a closed loop shape like a ring.

The compression nut can be tightened over a proximal end of the connector body such that the grommet is correspondingly compressed by tightening the nut. As the grommet is compressed, any gripping balls located therein are urged to provide a mechanical grip with the cable. For MC cables that have a metal armor protecting them, any grounding balls attached to the grommet are urged into contact with the armor to provide a grounding pathway for the cable.

For example, a gripping ball attached to a proximal end of the grommet creates a mechanical grip with the outer jacket of a cable to help secure the cable to the connector and maintain the watertight seal created between the grommet and the cable. Additionally, the resulting contact of a grounding ball attached to a distal end of the grommet creates a grounding bond between the armor and the connector, and is also capable of providing a mechanical grip thereto. Thus, the connector of the present invention advantageously provides a secure and reliable way of quickly and easily terminating an MC cable having interlock armor.

Moreover, the secure fit provided by the mechanical grip prevents unintentional pullout of the cable.

The compression of the grommet can create a watertight seal between the cable and the rest of connector. Notably, the watertight seal can be formed on surfaces that are not completely round as long as the surface is free of voids and cracks. Both the gripping and grounding balls attached to the grommet have enough freedom of motion to move as the grommet is compressed for contacting the cable. More particularly, the movement of the balls is sufficient to mechanically grip or ground the cable even when the cable surface is not perfectly round. The grommet will maintain pressure on the balls while likewise maintaining a watertight seal around the cable and the compression surface.

A common problem of conventional cable connectors is the inability to fit a wide range of non-uniform cable sizes with a mechanical grip while also providing a grounding pathway for the metal armor of the cable. The use of gripping and/or grounding balls with the compression grommet creates a unique way of solving this problem. The balls also advantageously maintain a watertight seal between the connector and the cable. The electrically conductive grounding balls advantageously allow a grounding connection to be made with the metal armor without impeding the watertight seal created by the grommet. The use of such gripping and/or grounding balls instead of alternative means, such as ridged clamps, also permits a greater freedom of motion, thus allowing the connector to fit a greater range of cable types and sizes. Moreover, the use of the compression nut to urge the balls into position allows for quick install times, especially compared to screw clamps which require a greater number of operations needed to tighten the clamp.

BRIEF DESCRIPTION OF THE DRAWINGS

The numerous other advantages, features and functions of embodiments of a connector for retaining and securing a cable will become readily apparent and better understood in view of the following description and accompanying drawings. The following description is not intended to limit the scope of the connector, but instead merely provides exemplary embodiments for ease of understanding.

Figure 1:
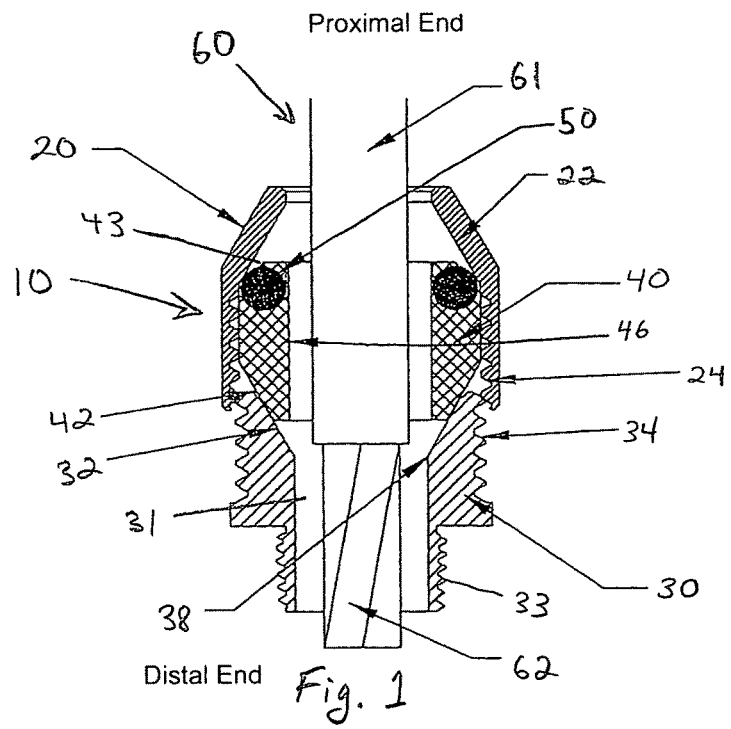
FIG. 1 is a schematic view of the connector of the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary configurations of a connector, and in no way limit the structures or configurations of a connector thereof according to the present disclosure.

DETAILED DESCRIPTION

A better understanding of different embodiments of the invention may be had from the following description read in conjunction with the accompanying drawings in which like reference characters refer to like elements.

In general, when a cable needs to be passed through a surface, an opening in the surface must be made, such as an opening in a piece of equipment. Such an opening may detrimentally provide an entry point through the surface for water, dirt, or other undesirable debris to pass through. Furthermore, the opening can potentially provide a point of contact to the cable that may result in chaffing or other damage to it. These problems can be especially harmful to any exposed conductors, such as wiring, retained in the cable. Thus, a fitting, such as a connector, is needed that is capable of securing a cable to an opening via a grounded watertight seal to eliminate or reduce potential damage to the cable. The connector is also used to prevent damage to the interior of the equipment, such as an electrical conduit box or other type of enclosure.

The connector of the present invention is provided to solve this dilemma by creating a mechanical grip with a cable, such as when connecting it to an opening of an enclosure. For example, the connector comprises a compression member that can be used to help secure, seal and ground a cable so that it terminates within the enclosure. The use of the compression member advantageously create a secure, grounded, and watertight barrier around cables having a wide range of diameter sizes, as well as around cables having non-uniform surfaces.

While the disclosure is susceptible to various modifications and alternative constructions, certain illustrative embodiments are shown in the drawings and are described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure.

As illustrated in FIG. 1, a connector 10 is configured for securing and retaining a cable or other generally round object, such as a metal clad cable, cord grip and tray cable. It should be appreciated that the connector 10 of the present invention can accommodate cables of varying size diameters, as well as cables having non-uniform diameters. In particular, the connector 10 may be used to secure a cable 60 having an outer jacket 61 and exposed conductors 62, such as wires, to an opening in a wall or barrier. Such a cable 60 is prepared for attachment to the connector 10 by cutting the outer jacket 61 to expose the individual conductors 62. For example, the connector 10 can connect the cable 60 to an opening of an electrical junction box for providing access to the individual conductors. The connector 10 advantageously secures the cable 60 in place via a mechanical grip with the outer jacket 61. Such a grip also maintains a strong and water-tight seal for protecting the exposed conductors 62, as well as any interior components of the attached box, from possible intrusion of foreign elements like dirt, debris and water. The connector is configured to accommodate many types of cables, such as cables that further comprise one or more additional cables of any type, and wherein said additional cables also include conductors.

The connector 10 comprises a tightening member 20, a connector body 30, and a compression member 40. The connector body 30 defines an axial hole 31 extending therethrough for receiving a cable. A first outer threaded region 33 is located at a first, or distal, end of the connector body, and a second outer threaded region 34 is oppositely located at a second, or proximal, end of the connector body, with a grip or abutment located therebetween. The first outer threaded region 33 allows the connector 10 to be threadingly secured to a corresponding mating region of a surface hole, and the second outer threaded region 34 permits threading attachment to the tightening member 20.

The axial hole 31 further comprises an end stop 38 located between the first and second ends of the of the connector body 30. An interior portion of the connector body preferably comprises an angled wall 32 at its second end. The angled wall 32 of the connector body is slanted in such a way that the diameter of the axial hole 31 gradually increases in size in the direction from the end stop 38 toward an opening at the second end to form a tapered section. This tapered section of the axial hole may define a frustum that provides adequate space for retaining a portion, such as a first end, of the compression member 40.

The tightening member 20 may be a generally annular compression nut, and defines a through-hole configured for alignment with the axial hole 31 of the connector body 30. The compression nut is releasably attachable to the second end of the connector body such that it is moveable thereon. In particular, an inner threaded region 24 located at a first end of the compression nut is correspondingly adapted to engage the second outer threaded region 34 of the connector body. A second, opposite, end of the compression nut preferably comprises an interior having at least one angled wall 22 slanted inwardly toward its through-hole, such that the diameter of the through-hole decreases in the direction toward the second end of the compression nut.

The compression member 40 may be a generally annular grommet made from a pliable and resilient material, such as rubber or other elastomeric material. The compression grommet is advantageously retained between the tightening member 20 and the connector body 30, and also comprises a through-hole defining an inner wall 46 for receiving the cable 60 passing through the connector. A first, or distal, end of the compression member may comprise a first beveled edge 42 corresponding to the angled wall 32 of the connector body, and an opposite second, or proximal, end of the compression member may comprise a second beveled edge 43 corresponding to the angled wall 22 of the tightening member.

The compression grommet 40 may have a substantially tubular shape and is configured such that its inner wall 46 forms a gripping connection with the cable 60 when the tightening member 20 is tightened to the connector body 30 via the mating connection between the inner threaded region 24 and the second outer threaded region 34. The angled wall 22 of the tightening member exerts force to the compression member at the second beveled edge 43 as it is tightened, thus causing the first beveled edge 42 of the compression member to be pushed tighter against the angled wall 32 of the connector body. Both the tightening member and the connector body are substantially rigid and strong so as to avoid deformation or breakage during use, and may comprise aluminum, brass, nickel plating, stainless steel, or other durable material. The increased diameter section of the axial hole 31 at the second end of the connector body 30 provides adequate space for retaining at least a portion of the first end of the compression grommet 40 as it is compressed by the angled wall 22 of the compression nut upon application of a sufficient amount of force resulting from tightening the compression nut.

The elasticity of the compression member 40 allows for constricting the diameter of its inner wall 46 to correspondingly squeeze the cable 60, and thus increase its grip thereto, as its first and second ends are compressed between the connector body 40 and the tightening member 20, respectively. This gripping connection formed by the compression member creates a seal between the cable 60 and the connector. Further tightening of the compression nut to the connector body 30 correspondingly tightens the grip between the cable 60 and the connector 10 such that a watertight seal may advantageously be formed. The end stop 38 further defines a wedge to ensure the grommet stays matingly compressed against the outer cable jacket 61. The end stop also may prevent the grommet from shifting any further into the first end of the connector body as the compression nut is tightened.

The compression member 40 further comprises gripping members 50, such as gripping balls, embedded therein for providing a mechanical grip to the cable 60. Such a secure fit provided by the mechanical grip prevents unintentional pullout of the cable. Each gripping ball 50 may be embedded within the compression member 40 via a form or pressure fit, and other retaining means such as adhesives may also be used to provide additional securement. At least one gripping ball may be embedded within the grommet for providing the mechanical grip, and more preferably, at least two gripping balls are embedded in order to ensure a strong and reliable mechanical grip. The gripping balls 50 may be located anywhere in or on the compression member 40, and may be spaced apart around the circumference of the compression member 40 when a plurality of gripping balls are used. It should be appreciated that each of the plurality of gripping balls 50 may vary in both size and/or material. For example, the balls may comprise a pliable material such as plastic, or a metal such as steel. Preferably, gripping balls of the same size are spaced equally apart from each other.

Each gripping ball 50 may be completely embedded within the compression member 40, or alternatively, may be embedded along an inner or outer edge of the compression member such that a portion of each ball protrudes therefrom for contacting either the cable 60 or the tightening member 20, respectively. Although FIG. 1 shows the gripping balls arranged within the proximal end of the compression grommet 40 for forming a mechanical grip with the outer jacket 61 of the cable, it should be appreciated that the gripping balls can also be embedded elsewhere within the compression grommet, such as at the distal end, for forming a mechanical grip with the cable. The gripping balls 50 are substantially rigid, but may further comprise a resilient material that would allow them to crush, deform or bend so as to not damage the cable 60 upon formation of the mechanical grip.

Figures 4A, 4B:
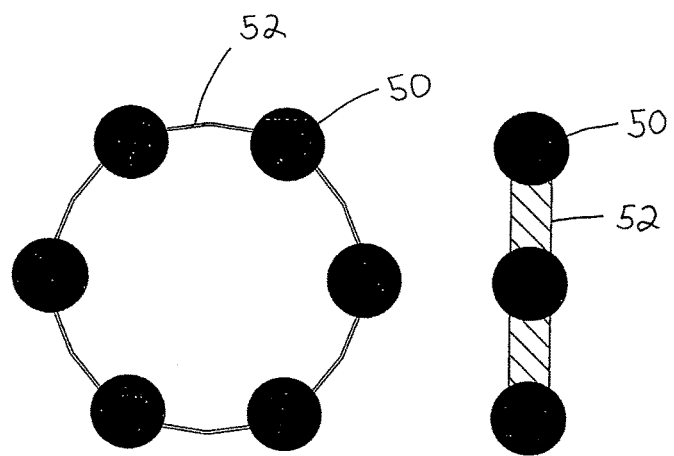
FIG. 4A is a top plan view of a coupling member in accordance with the present invention.
FIG. 4B is a side elevation view of the coupling member of FIG. 4A.

As illustrated in FIGS. 4A and 4B, the gripping balls 50 may be attached to a coupling member 52, such as a flexible ring, before inserting them into the grommet for improved retention and to ensure all the balls remain together. Attaching the balls to a ring keeps them together and thus reduces the risk of losing a ball, which could compromise the effectiveness of the connector. Thus, individual balls attached to the ring are not able to fall through the axial hole 31 and out of the connector if they become loose or dislodged from the grommet, which helps ensure none of the balls go missing. The coupling member 52 is configured to hold the balls in a uniform shape while also permitting the balls to be moved freely for positioning within the grommet. For example, the balls and ring may be molded together from a pliable material, such as plastic, that retains its shape but can be manipulated to a desired shape. In another embodiment, the balls may comprise metal, such as steel, and be coupled to each other via a coupling member such as a wire.

The first and second beveled edges 42, 43 of the compression member 40 help provide directional force to the at least one gripping ball 50 when the compression nut 20 is tightened. For example, as the grommet elastically deforms due to tightening the compression nut, the gripping balls 50 embedded in the grommet may be urged to form the mechanical grip. Additional tightening of the compression nut correspondingly increases the mechanical grip created by the gripping balls. This advantageously helps to secure the cable 60 to the connector 10, as well as enhance and maintain the watertight seal created between the grommet and the cable. The amount of force applied by the gripping balls 50 against the cable 60 can be selectively controlled by the amount of tightening applied by the compression nut.

The gripping balls 50 have enough freedom of motion to move with the compression member 40 and form a mechanical grip with the cable, as well as to adjust and maintain a secure grip even where the gripping surface is not uniform. As the compression member 40 is sufficiently squeezed between the compression nut 20 and the connector body 30, a corresponding amount of force will continue to urge the gripping balls toward the cable 60 for securing it in place. The grommet resiliently returns to its original shape as the tightening member 20 is loosened, which causes the mechanical grip formed by the gripping balls 50 to weaken, thus allowing the cable to be removed from the connector.

The use of the gripping balls 50 allows for a wider range of motion to fit a wider variety of cables, as opposed to conventional single ridge clamping devices. It should also be appreciated that the compression grommet 40 can further be formed for receiving gripping bars embedded therein. It may be desirable to use such bars having similar characteristics as the balls to provide a mechanical grip to flat cables.

Figure 2:
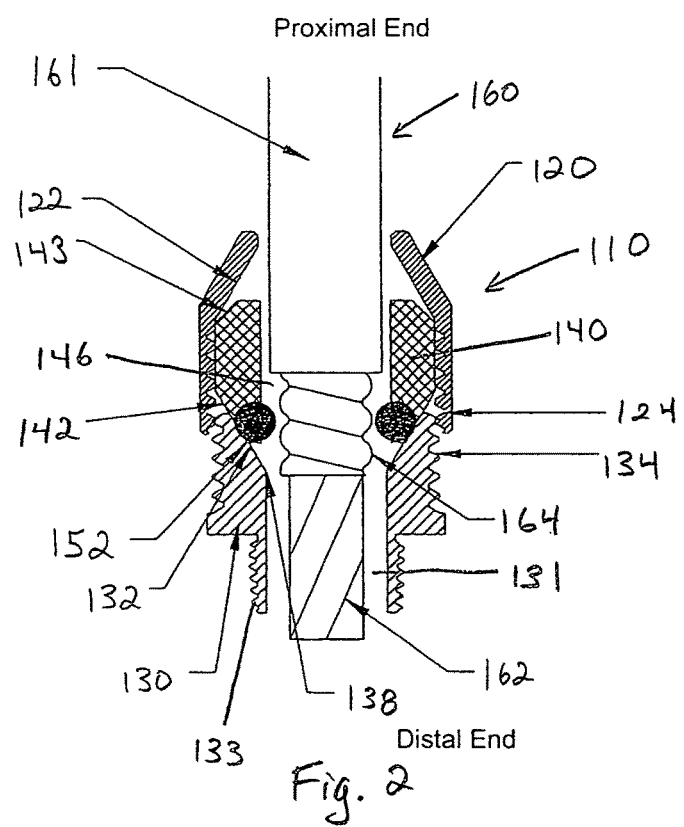
FIG. 2 is a schematic view of a variation of the connector of the present invention.

Turning to FIG. 2, a variation of the connector 110 of the present invention is shown which is further configured for both securing and grounding a cable or other generally round object. In particular, the connector 110 is shown for securing and grounding a metal clad (MC) cable 160 having armor 164, such as a twisted metal sheath or other type of MC armor, located between an outer jacket 161 and conductors 162. Such metallic armor 164 is used to provide extra protection to the conductors 162. Metallic armor is also electrically conductive, and thus there exists a need to ensure that the connector 110 and cable 160 remain grounded.

The connector 110 comprises a tightening member 120, a connector body 130, and a compression member 140. The connector body 130 defines an axial hole 131 extending therethrough for receiving a cable. A first outer threaded region 133 is located at a first, or distal, end of the connector body 130, and a second outer threaded region 134 is oppositely located at a second, or proximal, end of the connector body, with a grip or abutment located therebetween. The first outer threaded region 133 is used to secure the connector 110 to a corresponding hole in a wall or barrier, and the second outer threaded region 134 permits mating with the tightening member 120.

The axial hole 131 further comprises an end stop 138 located between the first and second ends of the of the connector body 130. An interior portion of the connector body preferably comprises an angled wall 132 at its second end. The angled wall 132 of the connector body 130 is slanted in such a way that the diameter of the axial hole 131 gradually increases in size in the direction from the end stop 138 toward an opening at the second end to form a tapered section. This tapered section of the axial hole 131 may define a frustum that provides adequate space for retaining a portion, such as a first end, of the compression member 140.

The tightening member 120 may be a generally annular compression nut, and defines a through-hole configured for alignment with the axial hole 131 of the connector body 130. The compression nut 120 is releasably attached to the second end of the connector body 130. In particular, an inner threaded region 124 located at a first end of the compression nut 120 is correspondingly adapted to engage the second outer threaded region 134 of the connector body. A second, opposite, end of the compression nut 120 preferably comprises an interior having at least one angled wall 122 slanted inwardly toward its through-hole, such that the diameter of the through-hole decreases in the direction toward the second end of the compression nut.

The compression member 140 may be a generally annular grommet made from a pliable and resilient material, such as rubber or other elastomeric material. The compression grommet 140 is advantageously retained between the tightening member 120 and the connector body 130, and also comprises a through-hole defining an inner wall 146 for receiving the cable 160 passing through the connector. A first, or distal, end of the compression member may comprise a first beveled edge 142 corresponding to the angled wall 132 of the connector body 130, and an opposite second, or proximal, end of the compression member may comprise a second beveled edge 143 corresponding to the angled wall 122 of the tightening member 120.

The compression grommet 140 is configured such that its inner wall 146 forms a gripping connection with the cable 160 when the tightening member 120 is tightened to the connector body 130 via the mating connection between the inner threaded region 124 and the second outer threaded region 134. The angled wall 122 of the tightening member 120 exerts force to the compression member 140 at the second beveled edge 143 as it is tightened, thus causing the first beveled edge 142 of the compression member to be pushed tighter against the angled wall 132 of the connector body 130. Both the tightening member 120 and the connector body are substantially rigid and strong so as to avoid deformation or breakage during use. The increased diameter section of the axial hole 131 at the second end of the connector body 130 provides adequate space for retaining at least a portion of the first end of the compression grommet 140 as it is compressed by the angled wall 122 of the compression nut 120 upon application of a sufficient amount of force resulting from tightening the compression nut.

The elasticity of the compression member 140 allows for constricting the diameter of its inner wall 146 to correspondingly squeeze the cable 160, and thus increase its grip thereto, as its first and second ends are compressed between the connector body 140 and the tightening member 120, respectively. This gripping connection formed by the compression member creates a seal between the cable 160 and the connector. Further tightening the compression nut 120 to the connector body 130 correspondingly tightens the grip between the cable 160 and the connector 110 such that a watertight seal may advantageously be formed. The end stop 138 further defines a wedge to ensure the grommet 140 stays matingly compressed against the cable 160. The end stop also may prevent the grommet from shifting any further into the first end of the connector body 130 as the compression nut 120 is tightened.

The MC cable 160 is prepared for attachment to the connector 110 by cutting both the outer jacket 161 and the armor 164 to expose the individual conductors 162. A grounding member 152, such as a grounding ball, embedded in the compression member 140 provides a grounding effect between the connector 110 and the cable 160. Preferably, at least one grounding ball 152 may be embedded anywhere in the compression member 140 such that the at least one ball contacts both the armor 164 and the connector body 130 to provide a path for grounding. Alternatively, the at least one grounding ball may be attached to the grommet such that it contacts both the armor and the tightening member 120 to provide a grounding pathway. Furthermore, multiple grounding balls may be used, for example, around the circumference of the grommet for providing a 360° ground.

The grounding balls 152 may be similar in size, shape and material to the gripping balls 50 shown in FIG. 1, however each grounding ball 152 further comprises a conductive material, such as metal or the like, capable of carrying a charge for grounding an electrical current. For example, each grounding ball 152 may be embedded to span across an inner and outer edge of the distal end of the compression member 140 such that a portion of each ball protrudes therefrom for contacting both the armor 164 and the angled wall 132 of the connector body as shown in FIG. 2. It should be appreciated that the grounding balls 152 may be embedded elsewhere within the compression grommet as long as a portion of each ball is exposed to contact both the armor 164 and the connector body, or both the armor and the tightening member. It should also be appreciated that, like the gripping balls 50 shown in FIGS. 4A and 4B and previously described, the grounding balls 152 may also be coupled together by attachment to a coupling member.

In addition to providing a grounding effect, it should be appreciated that each grounding ball 152 may also function as a gripping ball to provide a mechanical grip to better secure the cable 160, as well as to enhance the watertight seal formed by compression member 140. Each grounding ball 152 may be embedded within the compression member 140 via a form or pressure fit, and other retaining means such as adhesives may also be used to provide additional securement.

The first and second beveled edges 142, 143 of the compression member 140 help provide directional force to the at least one grounding ball 152 when the compression nut 120 is tightened. For example, as the grommet elastically deforms due to tightening the compression nut, the grounding balls 152 attached to the grommet are urged into contact with both connector body 130 and the armor 164. This resulting connection provides a path for grounding, and also may increase the mechanical grip applied to the cable 160. Thus, the grounding balls 152 advantageously ground and secure the cable to the connector, as well as enhance and maintain the watertight seal created between the compression member and the cable.

The amount of force applied by the grounding balls 152 against the armor 164 can be selectively controlled by the amount of tightening applied by the compression nut. The compression member 140 resiliently returns to its original shape as the tightening member 120 is loosened, which causes the mechanical grip to weaken. Upon sufficient loosening, the grounding balls disengage contact with either the connector body or the armor, thus terminating the grounding pathway.

Figure 3:
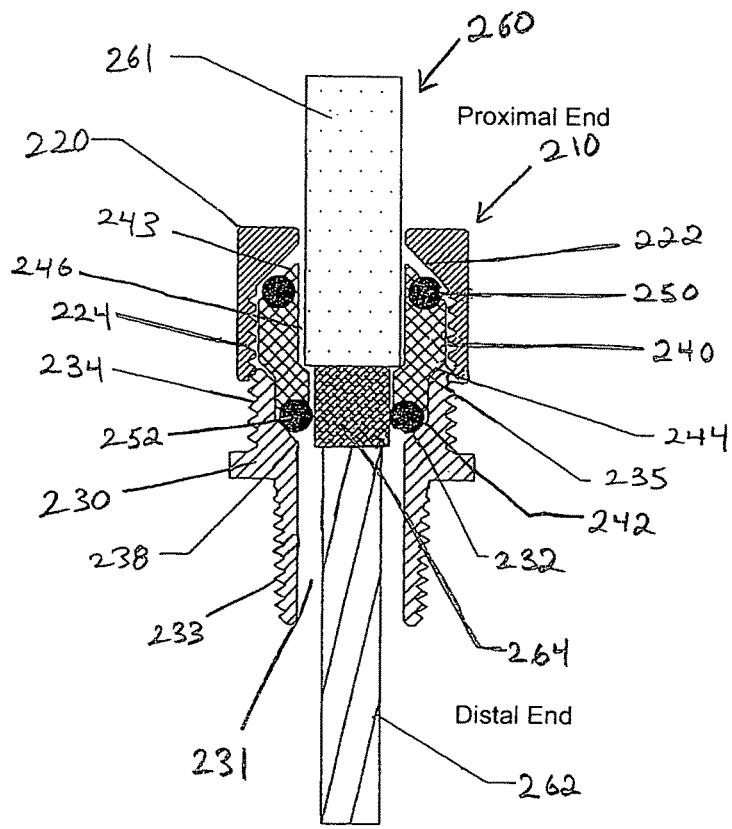
FIG. 3 is a schematic view of another variation of the connector of the present invention.

Another variation of the connector 210 is illustrated in FIG. 3. The connector 210 comprises a tightening member 220, a connector body 230, and a compression member 240. The connector is configured for securing and grounding a cable or other generally round object, as well as for maintaining a watertight seal with the cable. In particular, the connector 210 is adapted to accommodate a cable 260 having MC armor 264, such as a braided metal sheath or other type of MC armor, located between an outer jacket 261 and conductors 262.

The connector body 230 defines an axial hole 231 extending therethrough for receiving the cable. A first outer threaded region 233 is located at a first, or distal, end of the connector body 230, and a second outer threaded region 234 is oppositely located at a second, or proximal, end of the connector body, with a grip or abutment located therebetween. The first outer threaded region 233 is used to secure the connector 210 to a corresponding threaded hole in a wall or barrier, and the second outer threaded region 234 permits mating with the tightening member 220.

The axial hole 231 further comprises an end stop 238 located between the first and second ends of the of the connector body. An interior portion of the connector body preferably comprises a first angled wall 232 located between its distal and proximal ends, and a second angled wall 235 located at its proximal end. Each of the first and second angled walls 232, 235 of the connector body 230 are slanted in such a way that the diameter of the axial hole 231 at each corresponding region gradually increases in size in the direction toward an opening at the proximal end to form respective first and second tapered sections. Each tapered section of the connector body may define a frustum that provides adequate space for retaining a corresponding portion of the compression member 240.

The tightening member 220 may be a generally annular compression nut, and defines a through-hole configured for alignment with the axial hole 231 of the connector body 230. The compression nut is releasably attachable to the second end of the connector body. In particular, an inner threaded region 224 located at a first end of the compression nut 220 is correspondingly adapted to engage the second outer threaded region 234 of the connector body. A second, opposite, end of the compression nut 220 preferably comprises an interior having at least one angled wall 222 slanted inwardly toward its through-hole, such that the diameter of the through-hole decreases in the direction toward the second end of the compression nut.

The compression member 240 may be a generally annular grommet made from a pliable and resilient material, such as rubber or other elastomeric material. The grommet is advantageously retained between the tightening member 220 and the connector body 230, and also comprises a through-hole defining an inner wall 246 for receiving the cable 260 passing through the connector. A first, or distal, end of the compression member may comprise a first beveled edge 242 corresponding to the first angled wall 232 of the connector body 230, and an opposite second, or proximal, end of the compression member may comprise a second beveled edge 243 corresponding to the angled wall 222 of the tightening member 220. A third beveled edge 244 may be provided on the compression member between the first and second beveled edges for corresponding to the second angled wall 235 of the connector body.

The compression grommet 240 is configured such that its inner wall 246 forms a gripping connection with the cable 260 when the tightening member 220 is tightened to the connector body 230 via the threaded connection between the inner threaded region 224 and the second outer threaded region 234. The angled wall 222 of the tightening member exerts force to the grommet at the second beveled edge 243 as it is tightened, thus causing the first beveled edge 242 to be pushed tighter against the first angled wall 232 of the connector body, and the third beveled edge 244 to be pushed against the second angled wall 235.

The elasticity of the compression member 240 allows for constricting the diameter of its inner wall 246 to correspondingly squeeze the cable 260, and thus increase its grip thereto, as its first and second ends are compressed between the connector body 240 and the tightening member 220, respectively. This gripping connection formed by the compression member creates a seal between the cable 260 and the connector. Further tightening the compression nut 220 to the connector body 230 correspondingly tightens the grip between the cable 260 and the connector 210 such that a watertight seal may advantageously be formed. The end stop 238 further defines a wedge to ensure the grommet 240 stays matingly compressed against the cable 260. The end stop also may prevent the grommet from shifting any further into the first end of the connector body 230 as the compression nut 220 is tightened.

The MC cable 260 is prepared for attachment to the connector 210 by cutting both the outer jacket 261 and the armor 264 to expose the individual conductors 62. The interior wall 246 of the compression grommet may be shaped to conform to the cable. For example, the interior diameter of the compression grommet may vary to better conform to corresponding sections of the cable having different diameters, such as the outer jacket and the armor, for creating a watertight seal when compressed.

The compression member 240 comprises at least one gripping ball 250 and at least one grounding ball 252 embedded therein. The gripping balls 250 provide a mechanical grip with the cable 260, and the grounding balls 252 provide both a grounding path for the connector as well as a mechanical grip with the cable. Such a mechanical grip helps maintain a watertight seal between the connector and the cable. Both the gripping and grounding balls may be embedded within the compression member 240 via a form or pressure fit, and other retaining means such as adhesives may also be used to provide additional securement. The at least one grounding ball 252 is attached to the grommet such that it contacts both the armor 264 and the connector body 230 to provide the grounding path. It should also be appreciated that each of the plurality of gripping and grounding balls may vary in both size and material. The grounding balls 252, however, further comprises a conductive material capable of grounding an electrical current. It should further be appreciated that the gripping balls 250 may be coupled together by a coupling member. Likewise, the grounding balls 252 may be coupled together by a coupling member.

The beveled edges of the compression member 240 help provide directional force to the gripping and grounding balls when the compression nut 220 is tightened. In particular, the first, second and third beveled edges 242, 243, 244 correspond to the first angled wall 232 of the connector body, the angled wall 222 of the compression nut, and the second angled wall 235 of the connector body, respectively. For example, as the grommet 240 elastically deforms due to tightening the compression nut, the at least one grounding ball 252 attached to the grommet is urged into contact with both the connector body 230 and the armor 264 for providing the grounding path. Additionally, the at least one gripping ball 250 may be urged toward either the connector body, the tightening member or the cable to secure and maintain the watertight seal created by the grommet.

As previously described, the connector of the present invention is able to fit a wide range of non-uniform cable sizes with a mechanical grip while also providing a grounding pathway for the metal armor of the cable due to the use of gripping and/or grounding balls with the compression grommet. The gripping and grounding balls also advantageously maintain a watertight seal between the connector and the cable. The electrically conductive grounding balls advantageously allow a grounding connection to be made with the metal armor of the cable without obstructing the watertight seal created by the grommet. The use of the gripping and/or grounding balls in the present invention also permits a greater freedom of motion for allowing the connector to fit a greater range of cable types and sizes. Moreover, the use of the compression nut to urge the balls into position allows for quick and easy installation.

Although the embodiments have been disclosed in the context of certain exemplary embodiments, it therefore will be understood by those skilled in the art that the present invention extends beyond the specifically disclosed embodiments to other alternative embodiments, combinations of embodiments, and/or uses of the invention and modifications and equivalents thereof. Thus, it is intended that the scope of the present invention herein disclosed should not be limited by the particular disclosed embodiments described above.

What is claimed is:

1. A connector for retaining a cable to an opening, comprising:
    a connector body defining a distal end and an opposite proximal end, and having an axial hole extending through the distal and proximal ends for receiving the cable;
    a tightening member movably engaged to the proximal end of the connector body;
    a compression member retained between the connector body and the tightening member, the compression member defining a through-hole having an inner wall for receiving the cable passing through the connector and configured to fittingly grip the cable to form a watertight seal when the tightening member is tightened to the connector body; and
    a gripping member embedded to the compression member and adapted to form a mechanical grip with the cable when the tightening member is tightened to the connector body such that the mechanical grip secures the cable and maintains the watertight seal, wherein tightening the tightening member to the connector body correspondingly strengthens the mechanical grip.

2. The connector according to claim 1, wherein the connector body comprises a first outer threaded region located at the distal end for engaging the opening, and a second outer threaded region located at the proximal end for engaging the tightening member.

3. The connector according to claim 2, wherein the tightening member comprises a generally annular compression nut defining a through-hole and configured to align with the axial hole, and including a first end having an inner threaded section for engaging the second outer threaded region of the connector body, and an opposite second end having an angled wall slanted inwardly such that a diameter of the through-hole of the compression nut decreases in a direction toward the second end.

4. The connector according to claim 3, wherein the connector body further comprises an angled wall located at the proximal end and slanted such that the diameter of the axial hole gradually increases in size in the direction toward the proximal end to form a tapered section.

5. The connector according to claim 4, wherein the tapered section defines a frustum for retaining a corresponding portion of the compression member.

6. The connector according to claim 4, wherein the axial hole further comprises an end stop located between the distal and proximal ends of the connector body for preventing the compression member from shifting into the distal end of the connector body.

7. The connector according to claim 4, wherein the compression member further comprises a generally annular resilient grommet having a first beveled edge corresponding to the angled wall of the connector body, and an oppositely located second beveled edge corresponding to the angled wall of the compression nut.

8. The connector according to claim 3, wherein the connector body further comprises a first angled wall located between the distal and proximal ends and slanted such that the diameter of the axial hole gradually increases in size in the direction toward the proximal end to form a first tapered section, and a second angled wall located at the proximal end and slanted such that the diameter of the axial hole gradually increases in size in the direction toward the proximal end to form a second tapered section.

9. The connector according to claim 8, wherein the first and second tapered sections define a first frustum and a second frustum, respectively, for retaining corresponding portions of the compression member.

10. The connector according to claim 8, wherein the axial hole further comprises an end stop located between the distal and proximal ends of the connector body for preventing the compression member from shifting into the distal end of the connector body.

11. The connector according to claim 8, wherein the compression member further comprises a generally annular resilient grommet having a first beveled edge corresponding to the first angled wall of the connector body, and an oppositely located second beveled edge corresponding to the angled wall of the tightening member, and a third beveled edge located between the first and second beveled edges and corresponding to the second angled wall of the connector body.

12. The connector of claim 1, wherein the gripping member comprises at least one gripping ball.

13. The connector of claim 12, wherein the gripping member further comprises at least two gripping balls coupled together by a coupling member.

14. The connector of claim 13, wherein the at least two gripping balls are the same size.

15. The connector of claim 13, wherein the at least two gripping balls vary in size.

16. The connector of claim 1, the compression member further including at least one pre-formed hole configured to receive the gripping member, such that the gripping member is at least partially embedded in the compression member by a form or pressure fit.

17. The connector of claim 16, further comprising a gripping member attached to the compression member and adapted to form a mechanical grip with the cable when the tightening member is tightened to the connector body such that the mechanical grip secures the cable and maintains the watertight seal, wherein tightening the tightening member to the connector body correspondingly strengthens the mechanical grip.

18. The connector of claim 1, further comprising a grounding member attached to the compression member, and adapted to provide a grounding path between the cable and the connector by tightening the tightening member to the connector body.

19. A connector for retaining and terminating a metal clad electrical cable to an opening, comprising;
- a connector body defining a distal end and an opposite proximal end, and having an axial hole extending through the distal and proximal ends for receiving the cable;
- a tightening member movably engaged to the proximal end of the connector body;
- a compression member retained between the connector body and the tightening member, the compression member defining a through-hole having an inner wail for receiving the cable passing through the connector and configured to fittingly grip the cable to form a watertight seal when the tightening member is tightened to the connector body; and
- a grounding member embedded to the compression member, and adapted to provide a grounding path between the cable and the connector, wherein tightening the tightening member to the connector body provides the grounding path.

20. A connector for retaining and terminating a metal cad electrical cable to an opening, comprising:
- a connector body defining a distal end and an opposite proximal end, and having an axial hole extending through the distal and proximal ends for receiving the cable;
- a compression nut movably engaged to the proximal end of the connector body;
- a compression grommet retained between the connector body and the compression nut, the compression grommet defining a through-hole having an inner wall for receiving the cable passing through the connector and configured to fittingly grip the cable to form a watertight seal when the compression nut is tightened to the connector body;
- at least one gripping ball embedded to the compression grommet and adapted to form a mechanical grip with the cable such that tightening the compression nut to the connector body strengthens the mechanical grip to secure the cable and maintain the watertight seal; and
- at least one grounding ball embedded to the compression grommet and adapted to provide a grounding path between the cable and the connector by tightening the compression nut to the connector body.

* * * * *